US012767754B2

(12) United States Patent
Gao et al.

(10) Patent No.: US 12,767,754 B2
(45) Date of Patent: Oct. 20, 2026

(54) POLYURETHANE FOAM AND METHODS OF FORMING THE SAME

(71) Applicant: SAINT-GOBAIN PERFORMANCE PLASTICS CORPORATION, Solon, OH (US)

(72) Inventors: Qing Gao, Shanghai (CN); Yue Dong, Shanghai (CN)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 0 days.

(21) Appl. No.: 17/447,702

(22) Filed: Sep. 15, 2021

(65) Prior Publication Data

US 2022/0089806 A1 Mar. 24, 2022

Related U.S. Application Data

(60) Provisional application No. 63/089,608, filed on Oct. 9, 2020.

(30) Foreign Application Priority Data

Sep. 21, 2020 (CN) ......................... 202010996435.1

(51) Int. Cl.

| | |
|---|---|
| ***C08G 18/08*** | (2006.01) |
| ***C08G 18/12*** | (2006.01) |
| ***C08G 18/40*** | (2006.01) |
| ***C08G 18/42*** | (2006.01) |
| ***C08G 18/48*** | (2006.01) |
| ***C08J 9/00*** | (2006.01) |
| *C08G 101/00* | (2006.01) |

(52) U.S. Cl.

CPC ............. *C08G 18/14* (2013.01); *C08G 18/12* (2013.01); *C08G 18/42* (2013.01); *C08G 18/4804* (2013.01); *C08G 18/4829* (2013.01); *C08J 9/0061* (2013.01); *C08G 2101/00* (2013.01); *C08G 2110/0041* (2021.01); *C08J 2375/06* (2013.01); *C08J 2375/08* (2013.01)

(58) Field of Classification Search

None

See application file for complete search history.

(56) References Cited

U.S. PATENT DOCUMENTS 5,492,731 A * 2/1996 Temple ................ C09D 175/16 427/407.1
5,527,833 A * 6/1996 Kuczynski ......... C08G 18/6511 521/174
5,786,409 A * 7/1998 Kurple .................. B22C 1/2293 524/875
5,900,442 A 5/1999 Leenslag et al.
5,919,395 A 7/1999 Bastin et al.
6,316,514 B1 11/2001 Falke et al.
6,716,890 B1 4/2004 Niederoest et al.
8,124,665 B2 2/2012 Rosthauser et al.
8,188,156 B2 5/2012 Yamanaka et al.
8,318,823 B2 11/2012 Triouleyre et al.
8,541,479 B2 9/2013 Sasaki et al.
9,018,272 B2 4/2015 Neff et al.
9,266,997 B2 2/2016 Peters
2002/0169227 A1 11/2002 Allen et al.
2004/0266897 A1 12/2004 Apichatachutapan et al.
2005/0049324 A1 3/2005 Hashimoto et al.
2005/0272828 A1* 12/2005 Fujiwara .............. C08K 5/0025 521/155
2008/0207787 A1 8/2008 Clatty et al.
2009/0264547 A1 10/2009 Klesczewski et al.
2010/0179240 A1* 7/2010 Sasaki ................ C08G 18/4866 521/174
2011/0034575 A1 2/2011 Triouleyre et al.
2011/0190408 A1 8/2011 Casati et al.
2012/0009401 A1 1/2012 McCoy et al.
2013/0085200 A1* 4/2013 Aou ................... C08G 18/6677 521/170
2013/0178548 A1 7/2013 Aou et al.
2014/0179812 A1 6/2014 Jackson
2015/0232631 A1 8/2015 Balbo Block et al.
2016/0046779 A1 2/2016 Neff et al.
2017/0096518 A1 4/2017 Hernandez Garcia (Continued)

FOREIGN PATENT DOCUMENTS

CN 105461882 B 5/2018
CN 109160992 A 1/2019

(Continued)

OTHER PUBLICATIONS

International Search Report and Written Opinion for PCT Application No. PCT/US2021/072658, dated Mar. 24, 2022, 9 pages.

(Continued)

*Primary Examiner* — Melissa A Rioja

(74) *Attorney, Agent, or Firm* — Abel Schillinger, LLP; Chi Suk Kim

(57) ABSTRACT

The subject application relates to polyurethane foam and methods of forming the same. A polyurethane foam may include a first polyol component and a second polyol component. The first polyol component may include a polyether polyol having a functionality of at least about 5. The second polyol component may include at least one component selected from the group of a polyether polyol having a functionality of not greater than about 4, and a polyester polyol having a functionality of not greater than about 4.

16 Claims, 1 Drawing Sheet

(56) References Cited

U.S. PATENT DOCUMENTS

| | | | |
|---|---|---|---|
| 2019/0322914 | A1 | 10/2019 | Kelch |
| 2019/0375881 | A1 | 12/2019 | Grassini et al. |
| 2020/0181315 | A1 | 6/2020 | Hadick et al. |
| 2022/0089826 | A1 | 3/2022 | Gao et al. |

FOREIGN PATENT DOCUMENTS

| | | | | |
|---|---|---|---|---|
| CN | 109422862 | A | 3/2019 | |
| CN | 109762136 | B | 5/2019 | |
| CN | 110167986 | A | 8/2019 | |
| GB | 2232676 | A * | 12/1990 | ......... C08G 18/3851 |
| JP | 2007145983 | A | 6/2007 | |
| JP | 2015052042 | A | 3/2015 | |
| JP | 2015117368 | A | 6/2015 | |
| JP | 2016190971 | A | 11/2016 | |
| JP | 2018131529 | A | 8/2018 | |
| JP | 2019517600 | A | 6/2019 | |
| WO | 9015833 | A1 | 12/1990 | |
| WO | 02062863 | A2 | 8/2002 | |
| WO | 2009060903 | A1 | 5/2009 | |
| WO | 2014037312 | A1 | 3/2014 | |
| WO | 2015183065 | A1 | 12/2015 | |
| WO | 2017210022 | A1 | 12/2017 | |
| WO | 2018063959 | A1 | 4/2018 | |
| WO | 2022061336 | A1 | 3/2022 | |
| WO | 2022061337 | A1 | 3/2022 | |
| WO | 2022126066 | A1 | 6/2022 | |

OTHER PUBLICATIONS

International Search Report and Written Opinion for PCT Application No. PCT/US2021/071456, dated Dec. 30, 2021, 10 pages.

International Search Report and Written Opinion for PCT Application No. PCT/US2021/071457, dated Dec. 28, 2021, 10 pages.

Supplementary European Search Report for European Application No. 21870444.3, dated Oct. 16, 2024, 1 page.

Supplementary European Search Report for European Application No. 21870445.0, dated Oct. 16, 2024, 2 pages.

* cited by examiner

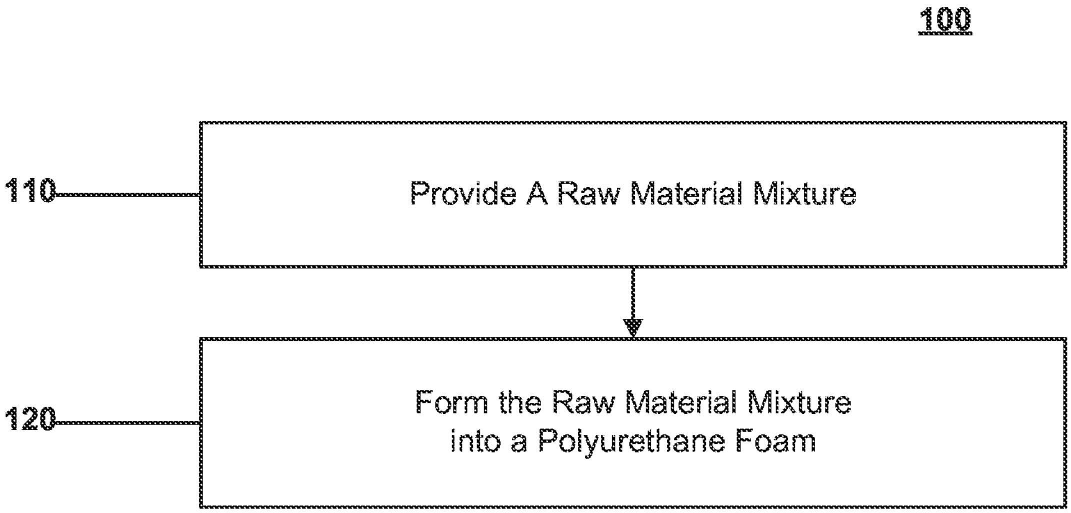
100
110
Provide A Raw Material Mixture
120
Form the Raw Material Mixture into a Polyurethane Foam

POLYURETHANE FOAM AND METHODS OF FORMING THE SAME

CROSS-REFERENCE TO RELATED APPLICATION(S)

This application claims priority to Chinese Patent Application No. 202010996435.1, filed Sep. 21, 2020, entitled "POLYURETHANE FOAM AND METHODS OF FORMING THE SAME," by Qing Gao et al., which is assigned to the current assignee hereof and incorporated herein by reference in its entirety. This application further claims priority under 35 U.S.C. § 119(e) to U.S. Provisional Patent Application No. 63/089,608, filed Oct. 9, 2020, entitled "POLYURETHANE FOAM AND METHODS OF FORMING THE SAME," by Qing Gao et al., which is assigned to the current assignee hereof and incorporated herein by reference in its entirety.

FIELD OF THE DISCLOSURE

The present disclosure relates to a polyurethane foam and methods of forming the same, more particularly, the present disclosure related to a polyurethane foam having a superior flame retardancy rating and methods of forming the same.

BACKGROUND

Polyurethane foams are widely used in applications of construction, transportation, and electronics. However, such polyurethanes foams often include specific characteristics that make them prone specific safety issues. For example, such polyurethane foams are generally prone to rapid fire growth due to their inherent chemical properties (i.e., the "—NH—COO— groups" of the polyurethane foam cause lower decomposition temperature than many other polymers) and physical properties (i.e., low density of the polyurethane causes severe dripping during combustion and porous structure promotes oxygen and heat transfer). Accordingly, polyurethane foams formulations with improved safety characteristics are desired.

SUMMARY

According to a first aspect, a polyurethane foam may include a first polyol component and a second polyol component. The first polyol component may include a polyether polyol having a functionality of at least about 5. The second polyol component may include at least one component selected from the group of a polyether polyol having a functionality of not greater than about 4, and a polyester polyol having a functionality of not greater than about 4. The polyurethane foam may have a density of not greater than about 200 kg/m$^3$. The polyurethane foam may have a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

According to a first aspect, a polyurethane foam may include a first polyol component and a second polyol component. The first polyol component may include a polyether polyol having a functionality of at least about 5. The second polyol component may include at least one component selected from the group of a polyether polyol having a functionality of not greater than about 4, and a polyester polyol having a functionality of not greater than about 4. The polyurethane foam may have a density of not greater than about 200 kg/m$^3$. The polyurethane foam may have a HBF rating based on a UL94 flame retardancy test performed at a polyurethane foam thickness of 1.0 mm.

According to yet another aspect, a method of forming a polyurethane foam may include providing a raw material mixture and forming the raw material mixture into a polyurethane foam. The raw material mixture may include a raw first polyol component and a raw second polyol component. The raw first polyol component may include a polyether polyol having a functionality of at least about 5. The raw second polyol component may include at least one component selected from the group of a polyether polyol having a functionality of not greater than about 4, and a polyester polyol having a functionality of not greater than about 4. The polyurethane foam may have a density of not greater than about 200 kg/m$^3$. The polyurethane foam may have a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

According to yet another aspect, a method of forming a polyurethane foam may include providing a raw material mixture and forming the raw material mixture into a polyurethane foam. The raw material mixture may include a raw first polyol component and a raw second polyol component. The raw first polyol component may include a polyether polyol having a functionality of at least about 5. The raw second polyol component may include at least one component selected from the group of a polyether polyol having a functionality of not greater than about 4, and a polyester polyol having a functionality of not greater than about 4. The polyurethane foam may have a density of not greater than about 200 kg/m$^3$. The polyurethane foam may have a HBF rating based on a UL94 flame retardancy test performed at a polyurethane foam thickness of 1.0 mm.

BRIEF DESCRIPTION OF THE DRAWINGS

Embodiments are illustrated by way of example and are not limited to the accompanying figures.

FIG. 1 includes a diagram showing a polyurethane foam forming method 100 according to embodiments described herein.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a polyurethane foam and methods of forming the same. More particularly, embodiments described herein are directed to a polyurethane foam having superior compression performance and flame retardancy, and methods of forming the same.

For purposes of illustration, FIG. 1 includes a diagram showing a polyurethane foam forming method 100 according to particular embodiments described herein. The polyurethane forming method 100 may include a first step 110 of providing a raw material mixture and a second step 120 of forming the raw material mixture into a polyurethane foam.

Referring to the first step 110, according to certain embodiments, the raw material mixture may include a raw first polyol component, and a raw second polyol component.

According to certain embodiments, the raw material mixture may include a particular content of raw first polyol component. For example, the raw material mixture may include a content of the raw first polyol component of at least about 2 wt. % for a total weight of the raw material mixture, such as, at least about 3 wt. % or at least about 4 wt. % or even at least about 5 wt. %. According to yet other embodiments, the raw material mixture may include a content of the raw first polyol component of not greater than about 10 wt. % for a total weight of the raw material mixture, such as, not greater than about 9 wt. % or not greater than about 8 wt. % or even not greater than about 7 wt. %. It will be appreciated that the content of the raw first polyol component in the raw material mixture may be within a range between any of the minimum and maximum values noted above. It will be further appreciated that the content of the raw first polyol component in the raw material mixture may be any value between any of the minimum and maximum values noted above.

According to yet other embodiments, the raw first polyol component may have a particular OH number. For example, the raw first polyol component may have an OH number of at least about 400 KOH mg/g, such as, at least about 405 KOH mg/g or at least about 410 KOH mg/g or at least about 415 KOH mg/g or at least about 420 KOH mg/g or even at least about 425 KOH mg/g. According to still other embodiments, the raw first polyol component may have an OH number of not greater than about 450 KOH mg/g, such as, not greater than about 445 KOH mg/g or not greater than about 440 KOH mg/g or not greater than about 435 KOH mg/g or even not greater than about 430 KOH mg/g. It will be appreciated that the OH number of the raw first polyol component may be within a range between any of the minimum and maximum values noted above. It will be further appreciated that the OH number of the raw first polyol component may be any value between any of the minimum and maximum values noted above.

According to still other embodiments, the raw first polyol component may include polyether polyols, polyester polyols, polymer polyols, bio-based polyols or combinations thereof.

According to yet other embodiments, the raw first polyol component may have a particular functionality. For example, the raw phosphorous polyol component may have a functionality of at least 5, such as, at least 6 or at least 7 or even at least 8.

According to other embodiments, the raw first polyol component may have a particular molecular mass. For example, the raw first polyol component may have a molecular mass of at least about 680 g/mol, such as, at least about 682 g/mol or at least about 684 g/mol or at least about 686 g/mol or at least about 688 g/mol or at least about 690 g/mol or at least about 692 g/mol or at least about 694 g/mol or at least about 696 g/mol or at least about 698 g/mol or even at least about 700. According to still other embodiments, the raw first polyol component may have a molecular mass of not greater than about 850 g/mol, such as, not greater than about 848 g/mol or not greater than about 846 g/mol or not greater than about 844 g/mol or not greater than about 842 g/mol or not greater than about 840 g/mol or not greater than about 838 g/mol or not greater than about 836 g/mol or not greater than about 834 g/mol or not greater than about 832 or even not greater than about 830 g/mol. It will be appreciated that the molecular mass of the raw first polyol component may be within a range between any of the minimum and maximum values noted above. It will be further appreciated that the molecular mass of the raw first polyol component may be any value between any of the minimum and maximum values noted above.

According to certain embodiments, the raw material mixture may include a particular content of raw second polyol component. For example, the raw material mixture may include a content of the raw second polyol component of at least about 5 wt. % for a total weight of the raw material mixture, such as, at least about 6 wt. % or at least about 7 wt. % or at least about 8 wt. % or at least about 9 wt. % or even at least about 10 wt. %. According to yet other embodiments, the raw material mixture may include a content of the raw second polyol component of not greater than about 15 wt. % for a total weight of the raw material mixture, such as, not greater than about 14 wt. % or not greater than about 13 wt. % or not greater than about 12 wt. % or even not greater than about 11 wt. %. It will be appreciated that the content of the raw second polyol component in the raw material mixture may be within a range between any of the minimum and maximum values noted above. It will be further appreciated that the content of the raw second polyol component in the raw material mixture may be any value between any of the minimum and maximum values noted above.

According to yet other embodiments, the raw second polyol component may have a particular OH number. For example, the raw second polyol component may have an OH number of at least about 250.0 KOH mg/g, such as, at least about 260 KOH mg/g or at least about 270 KOH mg/g or at least about 280 KOH mg/g or even at least about 290 KOH mg/g. According to still other embodiments, the raw second polyol component may have an OH number of not greater than about 350.0 KOH mg/g, such as, not greater than about 340 KOH mg/g or not greater than about 330 KOH mg/g or not greater than about 320 KOH mg/g or even not greater than about 310 KOH mg/g. It will be appreciated that the OH number of the raw second polyol component may be within a range between any of the minimum and maximum values noted above. It will be further appreciated that the OH number of the raw second polyol component may be any value between any of the minimum and maximum values noted above.

According to still other embodiments, the raw second polyol component may have a particular functionality. For example, the raw second polyol component may have a functionality of not greater than about 4, such as, not greater than about 3 or not greater than about 2 or even not greater than about 1.

According to still other embodiments, the raw second polyol component may include polyether polyol having a particular functionality. For example, the polyether polyol of the second polyol component may have a functionality of not greater than about 4, such as, not greater than about 3 or not greater than about 2 or even not greater than about 1.

According to still other embodiments, the raw second polyol component may include polyester polyol having a particular functionality. For example, the polyester polyol of the second polyol component may have a functionality of not greater than about 4, such as, not greater than about 3 or not greater than about 2 or even not greater than about 1.

According to other embodiments, the raw second polyol component may have a particular molecular mass. For example, the raw second polyol component may have a molecular mass of at least about 500 g/mol, such as, at least about 510 g/mol or at least about 520 g/mol or at least about 530 g/mol or at least about 540 g/mol or at least about 550 g/mol or at least about 560 g/mol or even at least about 570 g/mol. According to still other embodiments, the raw second polyol component may have a molecular mass of not greater than about 650 g/mol, such as, not greater than about 640 g/mol or not greater than about 630 g/mol or not greater than about 620 g/mol or not greater than about 610 g/mol or not greater than about 600 g/mol or not greater than about 590 g/mol or even not greater than about 580 g/mol. It will be appreciated that the molecular mass of the raw second polyol component may be within a range between any of the minimum and maximum values noted above. It will be further appreciated that the molecular mass of the raw second polyol component may be any value between any of the minimum and maximum values noted above.

According to still other embodiments, the raw material mixture may further include a raw third polyol component.

According to certain embodiments, the raw material mixture may include a particular content of raw third polyol component. For example, the raw material mixture may include a content of the raw third polyol component of at least about 5 wt. % for a total weight of the raw material mixture, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the raw material mixture may include a content of the raw third polyol component of not greater than about 25 wt. % for a total weight of the raw material mixture, such as, not greater than about 24 wt. % or not greater than about 23 wt. % or not greater than about 22 wt. % or not greater than about 21 wt. % or not greater than about 20 wt. % or not greater than about 19 wt. % or not greater than about 18 wt. % or not greater than about 17 wt. % or even not greater than about 16 wt. %. It will be appreciated that the content of the raw third polyol component in the raw material mixture may be within a range between any of the minimum and maximum values noted above. It will be further appreciated that the content of the raw third polyol component in the raw material mixture may be any value between any of the minimum and maximum values noted above.

According to yet other embodiments, the raw third polyol component may have a particular OH number. For example, the raw third polyol component may have an OH number of at least about 10 KOH mg/g, such as, at least about 12 KOH mg/g or at least about 14 KOH mg/g or at least about 16 KOH mg/g or even at least about 18 KOH mg/g. According to still other embodiments, the raw third polyol component may have an OH number of not greater than about 30 KOH mg/g, such as, not greater than about 28 KOH mg/g or not greater than about 26 KOH mg/g or not greater than about 24 KOH mg/g. It will be appreciated that the OH number of the raw third polyol component may be within a range between any of the minimum and maximum values noted above. It will be further appreciated that the OH number of the raw third polyol component may be any value between any of the minimum and maximum values noted above.

According to yet other embodiments, the raw third polyol component may have a particular functionality. For example, the raw phosphorous polyol component may have a functionality of not greater than 5, such as, not greater than 4 or not greater than 3 or not greater than 2 or even 1.

According to other embodiments, the raw third polyol component may have a particular molecular mass. For example, the raw third polyol component may have a molecular mass of at least about 7000 g/mol, such as, at least about 7250 g/mol or at least about 7500 g/mol or at least about 7750 g/mol or at least about 8000 g/mol or even at least about 8250 g/mol. According to still other embodiments, the raw third polyol component may have a molecular mass of not greater than about 10000 g/mol, such as, not greater than about 9750 g/mol or not greater than about 9500 g/mol or not greater than about 9250 g/mol or not greater than about 9000 g/mol or not greater than about 8750 g/mol or even not greater than about 8500 g/mol. It will be appreciated that the molecular mass of the raw third polyol component may be within a range between any of the minimum and maximum values noted above. It will be further appreciated that the molecular mass of the raw third polyol component may be any value between any of the minimum and maximum values noted above.

According to still other embodiments, the raw material mixture may further include a raw fourth polyol component.

According to certain embodiments, the raw material mixture may include a particular content of raw fourth polyol component. For example, the raw material mixture may include a content of the raw fourth polyol component of at least about 15 wt. % for a total weight of the raw material mixture, such as, at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or even at least about 25 wt. %. According to yet other embodiments, the raw material mixture may include a content of the raw fourth polyol component of not greater than about 45 wt. % for a total weight of the raw material mixture, such as, not greater than about 44 wt. % or not greater than about 43 wt. % or not greater than about 42 wt. % or not greater than about 41 wt. % or not greater than about 40 wt. % or not greater than about 39 wt. % or not greater than about 38 wt. % or not greater than about 37 wt. % or even not greater than about 33 wt. %. It will be appreciated that the content of the raw fourth polyol component in the raw material mixture may be within a range between any of the minimum and maximum values noted above. It will be further appreciated that the content of the raw fourth polyol component in the raw material mixture may be any value between any of the minimum and maximum values noted above.

According to yet other embodiments, the raw fourth polyol component may have a particular OH number. For example, the raw fourth polyol component may have an OH number of at least about 52 KOH mg/g, such as, at least about 52.5 KOH mg/g or at least about 53.0 KOH mg/g or at least about 53.5 KOH mg/g or even at least about 54.0 KOH mg/g. According to still other embodiments, the raw fourth polyol component may have an OH number of not greater than about 56.0 KOH mg/g, such as, not greater than about 55.5 KOH mg/g or not greater than about 55.0 KOH mg/g or not greater than about 54.5 KOH mg/g. It will be appreciated that the OH number of the raw fourth polyol component may be within a range between any of the minimum and maximum values noted above. It will be further appreciated that the OH number of the raw fourth polyol component may be any value between any of the minimum and maximum values noted above.

According to yet other embodiments, the raw fourth polyol component may have a particular functionality. For example, the raw phosphorous polyol component may have a functionality of not greater than 5, such as, not greater than 4 or not greater than 3 or not greater than 2 or even 1.

According to other embodiments, the raw fourth polyol component may have a particular molecular mass. For example, the raw fourth polyol component may have a molecular mass of at least about 2800 g/mol, such as, at least about 3000 g/mol. According to still other embodiments, the raw fourth polyol component may have a molecular mass of not greater than about 3600 g/mol, such as, not greater than about 3400 g/mol. It will be appreciated that the molecular mass of the raw fourth polyol component may be within a range between any of the minimum and maximum values noted above. It will be further appreciated that the molecular mass of the raw fourth polyol component may be any value between any of the minimum and maximum values noted above.

According to still other embodiments, the raw material mixture may further include a raw catalyst component.

According to still other embodiments, the raw catalyst component may include metal catalysts containing metal component such as tin, cooper, lead, zinc, cobalt, or nickel, and amine catalysts such as tertiary amine or quaternary ammonium salt.

According to certain embodiments, the raw material mixture may include a particular content of raw catalyst component. For example, the raw material mixture may include a content of the raw catalyst component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw catalyst component of not greater than about 5 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw catalyst component in the raw material mixture may be within a range between any of the minimum and maximum values noted above. It will be further appreciated that the content of the raw catalyst component in the raw material mixture may be any value between any of the minimum and maximum values noted above.

According to still other embodiments, the raw material mixture may further include a raw pigment component.

According to still other embodiments, the raw pigment component may include carbon dispersions in polyols.

According to certain embodiments, the raw material mixture may include a particular content of raw pigment component. For example, the raw material mixture may include a content of the raw pigment component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw pigment component of not greater than about 5 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw pigment component in the raw material mixture may be within a range between any of the minimum and maximum values noted above. It will be further appreciated that the content of the raw pigment component in the raw material mixture may be any value between any of the minimum and maximum values noted above.

According to still other embodiments, the raw material mixture may further include a raw chain extender component.

According to still other embodiments, the raw chain extender component may include compounds with at least two isocyanate reactive groups such as diethylene glycol, triethylene glycol, dipropylene glycol, or tri propylene glycol.

According to certain embodiments, the raw material mixture may include a particular content of raw chain extender component. For example, the raw material mixture may include a content of the raw chain extender component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw chain extender component of not greater than about 5 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw chain extender component in the raw material mixture may be within a range between any of the minimum and maximum values noted above. It will be further appreciated that the content of the raw chain extender component in the raw material mixture may be any value between any of the minimum and maximum values noted above.

According to still other embodiments, the raw material mixture may further include a raw thixotropic agent component.

According to still other embodiments, the raw thixotropic agent component may include aerosol, bentonite, polyuria compounds or combinations thereof.

According to certain embodiments, the raw material mixture may include a particular content of raw thixotropic agent component. For example, the raw material mixture may include a content of the raw thixotropic agent component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw thixotropic agent component of not greater than about 4 wt. % for a total weight of the raw material mixture, such as, not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw thixotropic agent component in the raw material mixture may be within a range between any of the minimum and maximum values noted above. It will be further appreciated that the content of the raw thixotropic agent component in the raw material mixture may be any value between any of the minimum and maximum values noted above.

According to still other embodiments, the raw material mixture may further include a raw isocyanate component.

According to still other embodiments, the raw isocyanate component may include monomeric methylenediphenyl diisocyanate (MDI), modified MDI, polymeric MDI and combinations thereof.

According to certain embodiments, the raw material mixture may include a particular content of raw isocyanate component. For example, the raw material mixture may include a content of the raw isocyanate component of at least about 8.0 wt. % for a total weight of the raw material mixture, such as, at least about 9 wt. % or at least about 10 wt. % or at least about 11 wt. % or at least about 12 wt. % or at least about 13 wt. % or at least about 14 wt. % or even at least about 15 wt. %. According to yet other embodiments, the raw material mixture may include a content of the raw isocyanate component of not greater than about 25 wt. % for a total weight of the raw material mixture, such as, not greater than about 24 wt. % or not greater than about 23 wt. % or not greater than about 22 wt. % or not greater than about 21 wt. % or even not greater than about 20 wt. %. It will be appreciated that the content of the raw isocyanate component in the raw material mixture may be within a range between any of the minimum and maximum values noted above. It will be further appreciated that the content of the raw isocyanate component in the raw material mixture may be any value between any of the minimum and maximum values noted above.

According to still other embodiments, the raw material mixture may further include a raw surfactant component.

According to certain embodiments, the raw material mixture may include a particular content of the raw surfactant component. For example, the raw material mixture may include a content of the raw surfactant component of at least about 1 wt. % for a total weight of the raw material mixture, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the raw material mixture may include a content of the raw surfactant component of not greater than about 15.0 wt. % for a total weight of the raw material mixture, such as, not greater than about 14.0 wt. % or not greater than about 13.0 wt. % or not greater than about 12.0 wt. % or not greater than about 11.0 wt. % or not greater than about 10.0 wt. % or not greater than about 9.0 wt. % or not greater than about 8.0 wt. % or even not greater than about 7.0 wt. %. It will be appreciated that the content of the raw surfactant component in the raw material mixture may be within a range between any of the minimum and maximum values noted above. It will be further appreciated that the content of raw surfactant component in the raw material mixture may be any value between any of the minimum and maximum values noted above.

According to yet other embodiments, forming the raw material mixture into a polyurethane foam may include foaming the raw material mixture to form a foamed material mixture. According to still other embodiments, forming the raw material mixture into a polyurethane foam may further include curing the foamed material mixture to form the polyurethane foam.

Referring now to the polyurethane foam formed according to embodiments described herein, the polyurethane foam may include a first polyol component, a second polyol component.

According to other embodiments, the polyurethane foam may have a particular compression curve ratio $CFD_{70}/CFD_{10}$, where $CFD_{70}$ is equal to the compression force deflection (CFD) of the polyurethane foam measured according to ASTM #D3574 at a 70% compression ratio and $CFD_{10}$ is equal to the compression force deflection (CFD) of the polyurethane foam measured according to ASTM #D3574 at a 10% compression ratio. For example, the polyurethane foam may have a compression curve ratio $CFD_{70}/CFD_{10}$ of not greater than about 10, such as, not greater than about 9.5 or not greater than about 9.0 or not greater than about 8.5 or not greater than about 8.0 or not greater than about 7.5 or not greater than about 7.0 or not greater than about 6.5 or not greater than about 6.0 or not greater than about 5.5 or even not greater than about 5. According to still other embodiments, the polyurethane foam may have a compression curve ratio $CFD_{70}/CFD_{10}$ of at least about 1, such as, at least about 2 or at least about 3 or even at least about 4. It will be appreciated that the compression curve ratio $CFD_{70}/CFD_{10}$ of the polyurethane foam may be within a range between any of the minimum and maximum values noted above. It will be further appreciated that the $CFD_{70}/CFD_{10}$ of the polyurethane foam may be any value between any of the minimum and maximum values noted above.

According to particular embodiments, the polyurethane foam may have a particular compression force deflection ($CFD_{10}$) as measured according to ASTM #D3574 at a 10% compression ratio. For example, the polyurethane foam may have a $CFD_{10}$ of at least about 15 KPa as measured at 10% compression ratio, such as, at least about 20 KPa or at least about 25 KPa or at least about 30 KPa or even at least about 35 KPa. According to still other embodiments, the polyurethane foam may have a $CFD_{10}$ of not greater than about 50 KPa, such as, not greater than about 45 KPa or even not greater than about 40 KPa. It will be appreciated that the $CFD_{10}$ of the polyurethane foam may be within a range between any of the minimum and maximum values noted above. It will be further appreciated that the $CFD_{10}$ of the polyurethane foam may be any value between any of the minimum and maximum values noted above.

According to yet other embodiments, the polyurethane foam may have a particular compression force deflection ($CFD_{70}$) as measured according to ASTM #D3574 at a 70% compression ratio. For example, the polyurethane foam may have a $CFD_{70}$ of at least about 100 KPa as measured at 70% compression ratio, such as, at least about 120 or at least about 140 KPa or at least about 160 KPa or at least about 180 KPa or even at least about 200 KPa. According to still other embodiments, the polyurethane foam may have a $CFD_{70}$ of not greater than about 250 KPa, such as, not greater than about 240 KPa or not greater than about 230 KPa or not greater than about 220 KPa or even not greater than about 210 KPa. It will be appreciated that the $CFD_{70}$ of the polyurethane foam may be within a range between any of the minimum and maximum values noted above. It will be further appreciated that the $CFD_{70}$ of the polyurethane foam may be any value between any of the minimum and maximum values noted above.

According to particular embodiments, the polyurethane foam formed according to embodiments described herein may have a HBF rating based on a UL94 flame retardancy test performed at a polyurethane foam thickness of 3.5 mm.

According to other embodiments, the polyurethane foam formed according to embodiments described herein may have a HBF rating based on a UL94 flame retardancy test performed at a polyurethane foam thickness of 3.0 mm.

According to other embodiments, the polyurethane foam formed according to embodiments described herein may have a HBF rating based on a UL94 flame retardancy test performed at a polyurethane foam thickness of 2.5 mm.

According to other embodiments, the polyurethane foam formed according to embodiments described herein may have a HBF rating based on a UL94 flame retardancy test performed at a polyurethane foam thickness of 1.0 mm.

According to still other embodiments, the polyurethane foam may have a particular density as measured according to ASTM #D3574. For example, the polyurethane foam may have a density of at least about 50 $kg/m^3$, such as, at least about 55 $kg/m^3$ or at least about 60 $kg/m^3$ or at least about 65 $kg/m^3$ or at least about 70 $kg/m^3$ or at least about 75 $kg/m^3$ or at least about 80 $kg/m^3$ or at least about 85 $kg/m^3$ or at least about 90 $kg/m^3$ or at least about 95 $kg/m^3$ or at least about 100 $kg/m^3$ or at least about 105 $kg/m^3$ or at least about 110 $kg/m^3$ or at least about 115 $kg/m^3$ or even at least about 120 $kg/m^3$. According to still other embodiments, the polyurethane foam may have a density of not greater than about 190 $kg/m^3$, such as, not greater than about 185 $kg/m^3$ or not greater than about 180 $kg/m^3$ or not greater than about 175 $kg/m^3$ or not greater than about 170 $kg/m^3$ or not greater than about 165 $kg/m^3$ or not greater than about 160 $kg/m^3$ or not greater than about 155 $kg/m^3$ or not greater than about 150 $kg/m^3$ or not greater than about 145 kg/m' or not greater than about 140 kg/m' or not greater than about 135 kg/m' or not greater than about 130 kg/m' or even not greater than about 125 kg/m'. It will be appreciated that the density of the polyurethane foam may be within a range between any of the minimum and maximum values noted above. It will be further appreciated that the density of the polyurethane foam may be any value between any of the minimum and maximum values noted above.

According to certain embodiments, the polyurethane foam may include a particular content of the first polyol component. For example, the polyurethane foam may include a content of the first polyol component of at least about 2 wt. % for a total weight of the polyurethane foam, such as, at least about 3 wt. % or at least about 4 wt. % or even at least about 5 wt. %. According to yet other embodiments, the polyurethane foam may include a content of the first polyol component of not greater than about 10 wt. % for a total weight of the polyurethane foam, such as, not greater than about 9 wt. % or not greater than about 8 wt. % or even not greater than about 7 wt. %. It will be appreciated that the content of the first polyol component in the polyurethane foam may be within a range between any of the minimum and maximum values noted above. It will be further appreciated that the content of the first polyol component in the polyurethane foam may be any value between any of the minimum and maximum values noted above.

According to yet other embodiments, the first polyol component may have a particular OH number. For example, the first polyol component may have an OH number of at least about 400 KOH mg/g, such as, at least about 405 KOH mg/g or at least about 410 KOH mg/g or at least about 415 KOH mg/g or at least about 420 KOH mg/g or even at least about 425 KOH mg/g. According to still other embodiments, the first polyol component may have an OH number of not greater than about 450 KOH mg/g, such as, not greater than about 445 KOH mg/g or not greater than about 440 KOH mg/g or not greater than about 435 KOH mg/g or even not greater than about 430 KOH mg/g. It will be appreciated that the OH number of the first polyol component may be within a range between any of the minimum and maximum values noted above. It will be further appreciated that the OH number of the first polyol component may be any value between any of the minimum and maximum values noted above.

According to still other embodiments, the first polyol component may include polyether polyols, polyester polyols, polymer polyols, bio-based polyols or combinations thereof.

According to yet other embodiments, the first polyol component may have a particular functionality. For example, the phosphorous polyol component may have a functionality of at least 5, such as, at least 6 or at least 7 or even at least 8.

According to other embodiments, the first polyol component may have a particular molecular mass. For example, the first polyol component may have a molecular mass of at least about 680 g/mol, such as, at least about 682 g/mol or at least about 684 g/mol or at least about 686 g/mol or at least about 688 g/mol or at least about 690 g/mol or at least about 692 g/mol or at least about 694 g/mol or at least about 696 g/mol or at least about 698 g/mol or even at least about 700. According to still other embodiments, the first polyol component may have a molecular mass of not greater than about 850 g/mol, such as, not greater than about 848 g/mol or not greater than about 846 g/mol or not greater than about 844 g/mol or not greater than about 842 g/mol or not greater than about 840 g/mol or not greater than about 838 g/mol or not greater than about 836 g/mol or not greater than about 834 g/mol or not greater than about 832 or even not greater than about 830 g/mol. It will be appreciated that the molecular mass of the first polyol component may be within a range between any of the minimum and maximum values noted above. It will be further appreciated that the molecular mass of the first polyol component may be any value between any of the minimum and maximum values noted above.

According to certain embodiments, the polyurethane foam may include a particular content of a second polyol component. For example, the polyurethane foam may include a content of the second polyol component of at least about 5 wt. % for a total weight of the polyurethane foam, such as, at least about 6 wt. % or at least about 7 wt. % or at least about 8 wt. % or at least about 9 wt. % or even at least about 10 wt. %. According to yet other embodiments, the polyurethane foam may include a content of the second polyol component of not greater than about 15 wt. % for a total weight of the polyurethane foam, such as, not greater than about 14 wt. % or not greater than about 13 wt. % or not greater than about 12 wt. % or even not greater than about 11 wt. %. It will be appreciated that the content of the second polyol component in the polyurethane foam may be within a range between any of the minimum and maximum values noted above. It will be further appreciated that the content of the second polyol component in the polyurethane foam may be any value between any of the minimum and maximum values noted above.

According to yet other embodiments, the second polyol component may have a particular OH number. For example, the second polyol component may have an OH number of at least about 250.0 KOH mg/g, such as, at least about 260 KOH mg/g or at least about 270 KOH mg/g or at least about 280 KOH mg/g or even at least about 290 KOH mg/g. According to still other embodiments, the second polyol component may have an OH number of not greater than about 350 KOH mg/g, such as, not greater than about 340 KOH mg/g or not greater than about 330 KOH mg/g or not greater than about 320 KOH mg/g or even not greater than about 310 KOH mg/g. It will be appreciated that the OH number of the second polyol component may be within a range between any of the minimum and maximum values noted above. It will be further appreciated that the OH number of the second polyol component may be any value between any of the minimum and maximum values noted above.

According to still other embodiments, the second polyol component may have a particular functionality. For example, the second polyol component may have a functionality of not greater than about 4, such as, not greater than about 3 or not greater than about 2 or even not greater than about 1.

According to still other embodiments, the second polyol component may include polyether polyol having a particular functionality. For example, the polyether polyol of the second polyol component may have a functionality of not greater than about 4, such as, not greater than about 3 or not greater than about 2 or even not greater than about 1.

According to still other embodiments, the second polyol component may include polyester polyol having a particular functionality. For example, the polyester polyol of the second polyol component may have a functionality of not greater than about 4, such as, not greater than about 3 or not greater than about 2 or even not greater than about 1.

According to other embodiments, the second polyol component may have a particular molecular mass. For example, the second polyol component may have a molecular mass of at least about 500 g/mol, such as, at least about 510 g/mol or at least about 520 g/mol or at least about 530 g/mol or at least about 540 g/mol or at least about 550 g/mol or at least about 560 g/mol or even at least about 570 g/mol. According to still other embodiments, the second polyol component may have a molecular mass of not greater than about 650 g/mol, such as, not greater than about 640 g/mol or not greater than about 630 g/mol or not greater than about 620 g/mol or not greater than about 610 g/mol or not greater than about 600 g/mol or not greater than about 590 g/mol or even not greater than about 580 g/mol. It will be appreciated that the molecular mass of the second polyol component may be within a range between any of the minimum and maximum values noted above. It will be further appreciated that the molecular mass of the second polyol component may be any value between any of the minimum and maximum values noted above.

According to still other embodiments, the polyurethane foam may further include a third polyol component.

According to certain embodiments, the polyurethane foam may include a particular content of third polyol component. For example, the polyurethane foam may include a content of the third polyol component of at least about 5 wt. % for a total weight of the polyurethane foam, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to yet other embodiments, the polyurethane foam may include a content of the third polyol component of not greater than about 25 wt. % for a total weight of the polyurethane foam, such as, not greater than about 24 wt. % or not greater than about 23 wt. % or not greater than about 22 wt. % or not greater than about 21 wt. % or not greater than about 20 wt. % or not greater than about 19 wt. % or not greater than about 18 wt. % or not greater than about 17 wt. % or even not greater than about 16 wt. %. It will be appreciated that the content of the third polyol component in the polyurethane foam may be within a range between any of the minimum and maximum values noted above. It will be further appreciated that the content of the third polyol component in the polyurethane foam may be any value between any of the minimum and maximum values noted above.

According to yet other embodiments, the third polyol component may have a particular OH number. For example, the third polyol component may have an OH number of at least about 10 KOH mg/g, such as, at least about 12 KOH mg/g or at least about 14 KOH mg/g or at least about 16 KOH mg/g or even at least about 18 KOH mg/g. According to still other embodiments, the third polyol component may have an OH number of not greater than about 30 KOH mg/g, such as, not greater than about 28 KOH mg/g or not greater than about 26 KOH mg/g or not greater than about 24 KOH mg/g. It will be appreciated that the OH number of the third polyol component may be within a range between any of the minimum and maximum values noted above. It will be further appreciated that the OH number of the third polyol component may be any value between any of the minimum and maximum values noted above.

According to yet other embodiments, the third polyol component may have a particular functionality. For example, the phosphorous polyol component may have a functionality of not greater than 5, such as, not greater than 4 or not greater than 3 or not greater than 2 or even 1.

According to other embodiments, the third polyol component may have a particular molecular mass. For example, the third polyol component may have a molecular mass of at least about 7000 g/mol, such as, at least about 7250 g/mol or at least about 7500 g/mol or at least about 7750 g/mol or at least about 8000 g/mol or even at least about 8250 g/mol. According to still other embodiments, the third polyol component may have a molecular mass of not greater than about 10000 g/mol, such as, not greater than about 9750 g/mol or not greater than about 9500 g/mol or not greater than about 9250 g/mol or not greater than about 9000 g/mol or not greater than about 8750 g/mol or even not greater than about 8500 g/mol. It will be appreciated that the molecular mass of the third polyol component may be within a range between any of the minimum and maximum values noted above. It will be further appreciated that the molecular mass of the third polyol component may be any value between any of the minimum and maximum values noted above.

According to still other embodiments, the polyurethane foam may further include a fourth polyol component.

According to certain embodiments, the polyurethane foam may include a particular content of a fourth polyol component. For example, the polyurethane foam may include a content of the fourth polyol component of at least about 15 wt. % for a total weight of the polyurethane foam, such as, at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or even at least about 25 wt. %. According to yet other embodiments, the polyurethane foam may include a content of the fourth polyol component of not greater than about 45 wt. % for a total weight of the polyurethane foam, such as, not greater than about 44 wt. % or not greater than about 43 wt. % or not greater than about 42 wt. % or not greater than about 41 wt. % or not greater than about 40 wt. % or not greater than about 39 wt. % or not greater than about 38 wt. % or not greater than about 37 wt. % or even not greater than about 33 wt. %. It will be appreciated that the content of the fourth polyol component in the polyurethane foam may be within a range between any of the minimum and maximum values noted above. It will be further appreciated that the content of the fourth polyol component in the polyurethane foam may be any value between any of the minimum and maximum values noted above.

According to yet other embodiments, the fourth polyol component may have a particular OH number. For example, the fourth polyol component may have an OH number of at least about 52 KOH mg/g, such as, at least about 52.5 KOH mg/g or at least about 53.0 KOH mg/g or at least about 53.5 KOH mg/g or even at least about 54.0 KOH mg/g. According to still other embodiments, the fourth polyol component may have an OH number of not greater than about 56.0 KOH mg/g, such as, not greater than about 55.5 KOH mg/g or not greater than about 55.0 KOH mg/g or not greater than about 54.5 KOH mg/g. It will be appreciated that the OH number of the fourth polyol component may be within a range between any of the minimum and maximum values noted above. It will be further appreciated that the OH number of the fourth polyol component may be any value between any of the minimum and maximum values noted above.

According to yet other embodiments, the fourth polyol component may have a particular functionality. For example, the phosphorous polyol component may have a functionality of not greater than 5, such as, not greater than 4 or not greater than 3 or not greater than 2 or even 1.

According to other embodiments, the fourth polyol component may have a particular molecular mass. For example, the fourth polyol component may have a molecular mass of at least about 2800 g/mol, such as, at least about 3000 g/mol. According to still other embodiments, the fourth polyol component may have a molecular mass of not greater than about 3600 g/mol, such as, not greater than about 3400 g/mol. It will be appreciated that the molecular mass of the fourth polyol component may be within a range between any of the minimum and maximum values noted above. It will be further appreciated that the molecular mass of the fourth polyol component may be any value between any of the minimum and maximum values noted above.

According to still other embodiments, the polyurethane foam may further include a catalyst component.

According to still other embodiments, the catalyst component may include metal catalysts containing metal component such as tin, cooper, lead, zinc, cobalt, or nickel, and amine catalysts such as tertiary amine or quaternary ammonium salt.

According to certain embodiments, the polyurethane foam may include a particular content of catalyst component. For example, the polyurethane foam may include a content of the catalyst component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the catalyst component of not greater than about 5 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the catalyst component in the polyurethane foam may be within a range between any of the minimum and maximum values noted above. It will be further appreciated that the content of the catalyst component in the polyurethane foam may be any value between any of the minimum and maximum values noted above.

According to still other embodiments, the polyurethane foam may further include a pigment component.

According to still other embodiments, the pigment component may include carbon dispersions in polyols.

According to certain embodiments, the polyurethane foam may include a particular content of pigment component. For example, the polyurethane foam may include a content of the pigment component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the pigment component of not greater than about 5 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the pigment component in the polyurethane foam may be within a range between any of the minimum and maximum values noted above. It will be further appreciated that the content of the pigment component in the polyurethane foam may be any value between any of the minimum and maximum values noted above.

According to still other embodiments, the polyurethane foam may further include a chain extender component.

According to still other embodiments, the chain extender component may include compounds with at least two isocyanate reactive groups such as diethylene glycol, triethylene glycol, dipropylene glycol, or tri propylene glycol.

According to certain embodiments, the polyurethane foam may include a particular content of chain extender component. For example, the polyurethane foam may include a content of the chain extender component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the chain extender component of not greater than about 5 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the chain extender component in the polyurethane foam may be within a range between any of the minimum and maximum values noted above. It will be further appreciated that the content of the chain extender component in the polyurethane foam may be any value between any of the minimum and maximum values noted above.

According to still other embodiments, the polyurethane foam may further include a thixotropic agent component.

According to still other embodiments, the thixotropic agent component may include aerosol, bentonite, polyuria compounds or combinations thereof.

According to certain embodiments, the polyurethane foam may include a particular content of thixotropic agent component. For example, the polyurethane foam may include a content of the thixotropic agent component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the thixotropic agent component of not greater than about 4 wt. % for a total weight of the polyurethane foam, such as, not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the thixotropic agent component in the polyurethane foam may be within a range between any of the minimum and maximum values noted above. It will be further appreciated that the content of the thixotropic agent component in the polyurethane foam may be any value between any of the minimum and maximum values noted above.

According to still other embodiments, the polyurethane foam may further include a isocyanate component.

According to still other embodiments, the isocyanate component may include monomeric methylenediphenyl diisocyanate (MDI), modified MDI, polymeric MDI and combinations thereof.

According to certain embodiments, the polyurethane foam may include a particular content of isocyanate component. For example, the polyurethane foam may include a content of the isocyanate component of at least about 8.0 wt. % for a total weight of the polyurethane foam, such as, at least about 9 wt. % or at least about 10 wt. % or at least about 11 wt. % or at least about 12 wt. % or at least about 13 wt. % or at least about 14 wt. % or even at least about 15 wt. %. According to yet other embodiments, the polyurethane foam may include a content of the isocyanate component of not greater than about 25 wt. % for a total weight of the polyurethane foam, such as, not greater than about 24 wt. % or not greater than about 23 wt. % or not greater than about 22 wt. % or not greater than about 21 wt. % or even not greater than about 20 wt. %. It will be appreciated that the content of the isocyanate component in the polyurethane foam may be within a range between any of the minimum and maximum values noted above. It will be further appreciated that the content of the isocyanate component in the polyurethane foam may be any value between any of the minimum and maximum values noted above.

According to still other embodiments, the polyurethane foam may further include a surfactant component.

According to certain embodiments, the polyurethane foam may include a particular content of the surfactant component. For example, the polyurethane foam may include a content of the surfactant component of at least about 1 wt. % for a total weight of the polyurethane foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the polyurethane foam may include a content of the surfactant component of not greater than about 15.0 wt. % for a total weight of the polyurethane foam, such as, not greater than about 14.0 wt. % or not greater than about 13.0 wt. % or not greater than about 12.0 wt. % or not greater than about 11.0 wt. % or not greater than about 10.0 wt. % or not greater than about 9.0 wt. % or not greater than about 8.0 wt. % or even not greater than about 7.0 wt. %. It will be appreciated that the content of the surfactant component in the polyurethane foam may be within a range between any of the minimum and maximum values noted above. It will be further appreciated that the content of surfactant component in the polyurethane foam may be any value between any of the minimum and maximum values noted above.

According to yet other embodiments, the polyurethane foam may have a particular thickness. For example, the polyurethane foam may have a thickness of at least about 0.5 mm, such as, at least about 0.55 mm or at least about 0.6 mm or at least about 0.65 mm or at least about 0.7 mm or even at least about 0.75 mm. According to still other embodiments, the polyurethane foam may have a thickness of not greater than about 15 mm, such as, not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or not greater than about 5.0 mm or not greater than about 4.5 mm or not greater than about 4.0 mm or not greater than about 3.5 mm or not greater than about 3.0 mm or not greater than about 2.5 mm or not greater than about 2.0 mm or not greater than about 1.5 mm or even not greater than about 1.0 mm. It will be appreciated that the thickness of the polyurethane foam may be within a range between any of the minimum and maximum values noted above. It will be further appreciated that the thickness of the polyurethane foam may be any value between any of the minimum and maximum values noted above.

Referring now to a particular use of the polyurethane foam formed according to embodiments described herein, a particular embodiment may include a battery compression pad that may include a polyurethane foam. It will be appreciated that the polyurethane foam of the battery compression pad may be formed according to any of the embodiments described herein. It will be further appreciated that the polyurethane foam of the batter compression pad may include any of the components described in reference to any of the embodiments described herein. It will be still further appreciated that the polyurethane foam of the battery compression pad may include any of the characteristics described in reference to embodiments described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A polyurethane foam comprising: a first polyol component comprising a polyether polyol having a functionality of at least about 5; and a second polyol component comprising at least one component selected from the group of a polyether polyol having a functionality of not greater than about 4, and a polyester polyol having a functionality of not greater than about 4, wherein the polyurethane foam comprises a density of not greater than about 200 kg/m', wherein the polyurethane foam comprises a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

Embodiment 2. A polyurethane foam comprising: a first polyol component comprising a polyether polyol having a functionality of at least about 5; and a second polyol component comprising at least one component selected from the group of a polyether polyol having a functionality of not greater than about 4, and a polyester polyol having a functionality of not greater than about 4, wherein the polyurethane foam comprises a density of not greater than about 200 kg/m$^3$, wherein the polyurethane foam comprises a HBF rating based on a UL94 flame retardancy test performed at a polyurethane foam thickness of 1.0 mm.

Embodiment 3. The polyurethane foam of embodiment 2, wherein the polyurethane foam comprises a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

Embodiment 4. The polyurethane foam of embodiment 1, wherein the polyurethane foam comprises a HBF rating based on a UL94 flame retardancy test performed at a polyurethane foam thickness of 1.0 mm.

Embodiment 5. The polyurethane foam of any one of embodiments 1, 2, 3, and 4, wherein the polyurethane foam comprises a $CFD_{70}$ of at least about 100 KPa.

Embodiment 6. The polyurethane foam of any one of embodiments 1, 2, 3, and 4, wherein the polyurethane foam comprises a $CFD_{70}$ of not greater than about 250 KPa.

Embodiment 7. The polyurethane foam of any one of embodiments 1, 2, 3, and 4, wherein the polyurethane foam comprises a $CFD_{10}$ of at least about 15 KPa.

Embodiment 8. The polyurethane foam of any one of embodiments 1, 2, 3, and 4, wherein the polyurethane foam comprises a $CFD_{10}$ of not greater than about 50 KPa.

Embodiment 9. The polyurethane foam of any one of embodiments 1, 2, 3, and 4, wherein the polyurethane foam comprises a density of not greater than about 190 kg/m$^3$.

Embodiment 10. The polyurethane foam of any one of embodiments 1, 2, 3, and 4, wherein the polyurethane foam comprises a density of at least about 50 kg/m$^3$.

Embodiment 11. The polyurethane foam of any one of embodiments 1, 2, 3, and 4, wherein the first polyol component comprises an OH number of at least about 400 KOH mg/g.

Embodiment 12. The polyurethane foam of any one of embodiments 1, 2, 3, and 4, wherein the first polyol component comprises an OH number of not greater than about 450 KOH mg/g.

Embodiment 13. The polyurethane foam of any one of embodiments 1, 2, 3, and 4, wherein the first polyol component comprises a molecular mass of at least about 680 g/mol.

Embodiment 14. The polyurethane foam of any one of embodiments 1, 2, 3, and 4, wherein the first polyol component comprises a molecular mass of not greater than about 850 g/mol.

Embodiment 15. The polyurethane foam of any one of embodiments 1, 2, 3, and 4, wherein the first polyol component comprises a functionality of 5.

Embodiment 16. The polyurethane foam of any one of embodiments 1, 2, 3, and 4, wherein the first polyol component comprises a functionality of 6.

Embodiment 17. The polyurethane foam of any one of embodiments 1, 2, 3, and 4, wherein the first polyol component comprises a functionality of 7.

Embodiment 18. The polyurethane foam of any one of embodiments 1, 2, 3, and 4, wherein the first polyol component comprises a functionality of 8.

Embodiment 19. The polyurethane foam of any one of embodiments 1, 2, 3, and 4, wherein the polyurethane foam comprises first polyol component content of at least about 2 wt. % for a total weight of the polyurethane foam.

Embodiment 20. The polyurethane foam of any one of embodiments 1, 2, 3, and 4, wherein the polyurethane foam comprises a first polyol component content of not greater than about 10 wt. % for a total weight of the polyurethane foam.

Embodiment 21. The polyurethane foam of any one of embodiments 1, 2, 3, and 4, wherein the second polyol component comprises a polyether polyol having a functionality of not greater than about 4.

Embodiment 22. The polyurethane foam of any one of embodiments 1, 2, 3, and 4, wherein the second polyol component comprises a polyester polyol having a functionality of not greater than about 4.

Embodiment 23. The polyurethane foam of any one of embodiments 1, 2, 3, and 4, wherein the second polyol component comprises an OH number of at least about 250 KOH mg/g.

Embodiment 24. The polyurethane foam of any one of embodiments 1, 2, 3, and 4, wherein the second polyol component comprises an OH number of not greater than about 350 KOH mg/g.

Embodiment 25. The polyurethane foam of any one of embodiments 1, 2, 3, and 4, wherein the second polyol component comprises a molecular mass of at least about 500 g/mol.

Embodiment 26. The polyurethane foam of any one of embodiments 1, 2, 3, and 4, wherein the second polyol component comprises a molecular mass of not greater than about 650 g/mol.

Embodiment 27. The polyurethane foam of any one of embodiments 1, 2, 3, and 4, wherein the second polyol component comprises a functionality of 4.

Embodiment 28. The polyurethane foam of any one of embodiments 1, 2, 3, and 4, wherein the second polyol component comprises a functionality of 3.

Embodiment 29. The polyurethane foam of any one of embodiments 1, 2, 3, and 4, wherein the second polyol component comprises a functionality of 2.

Embodiment 30. The polyurethane foam of any one of embodiments 1, 2, 3, and 4, wherein the second polyol component comprises a functionality of 1.

Embodiment 31. The polyurethane foam of any one of embodiments 1, 2, 3, and 4, wherein the polyurethane foam comprises a second polyol component content of at least about 5.0 wt. % for a total weight of the polyurethane foam.

Embodiment 32. The polyurethane foam of any one of embodiments 1, 2, 3, and 4, wherein the polyurethane foam comprises a second polyol component content of not greater than about 15.0 wt. % for a total weight of the polyurethane foam.

Embodiment 33. The polyurethane foam of any one of embodiments 1, 2, 3, and 4, wherein the polyurethane foam further comprises a third polyol component.

Embodiment 34. The polyurethane foam of embodiment 33, wherein the third polyol component comprises an OH number of at least about 10 KOH mg/g.

Embodiment 35. The polyurethane foam of embodiment 33, wherein the third polyol component comprises an OH number of not greater than about 30 KOH mg/g.

Embodiment 36. The polyurethane foam of embodiment 33, wherein the third polyol component comprises a molecular mass of at least about 7000 g/mol.

Embodiment 37. The polyurethane foam of embodiment 33, wherein the third polyol component comprises a molecular mass of not greater than about 10000 g/mol.

Embodiment 38. The polyurethane foam of embodiment 33, wherein the third polyol component comprises a functionality of 4.

Embodiment 39. The polyurethane foam of embodiment 33, wherein the third polyol component comprises a functionality of 3.

Embodiment 40. The polyurethane foam of embodiment 33, wherein the third polyol component comprises a functionality of 2.

Embodiment 41. The polyurethane foam of embodiment 33, wherein the third polyol component comprises a functionality of 1.

Embodiment 42. The polyurethane foam of embodiment 33, wherein the polyurethane foam comprises a third polyol component content of at least about 5.0 wt. % for a total weight of the polyurethane foam.

Embodiment 43. The polyurethane foam of embodiment 33, wherein the polyurethane foam comprises a third polyol component content of not greater than about 25.0 wt. % for a total weight of the polyurethane foam.

Embodiment 44. The polyurethane foam of any one of embodiments 1, 2, 3, and 4, wherein the polyurethane foam comprises a catalyst.

Embodiment 45. The polyurethane foam of embodiment 44, wherein the polyurethane foam comprises a catalyst content of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 46. The polyurethane foam of embodiment 44, wherein the polyurethane foam comprises a catalyst content of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 47. The polyurethane foam of any one of embodiments 1, 2, 3, and 4, wherein the polyurethane foam comprises a pigment.

Embodiment 48. The polyurethane foam of embodiment 47, wherein the polyurethane foam comprises a pigment content of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 49. The polyurethane foam of embodiment 47, wherein the polyurethane foam comprises a pigment content of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 50. The polyurethane foam of any one of embodiments 1, 2, 3, and 4, wherein the polyurethane foam comprises a chain extender.

Embodiment 51. The polyurethane foam of embodiment 50, wherein the polyurethane foam comprises a chain extender content of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 52. The polyurethane foam of embodiment 50, wherein the polyurethane foam comprises a chain extender content of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 53. The polyurethane foam of any one of embodiments 1, 2, 3, and 4, wherein the polyurethane foam comprises a thixotropic agent.

Embodiment 54. The polyurethane foam of embodiment 53, wherein the polyurethane foam comprises a thixotropic agent content of at least about 0.1 wt. % for a total weight of the polyurethane foam or at least about 0.25 wt. % or at least about 0.5 wt. % or at least about 0.75 wt.

Embodiment 55. The polyurethane foam of embodiment 53, wherein the polyurethane foam comprises a thixotropic agent content of not greater than about 4.0 wt. % for a total weight of the polyurethane foam or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or not greater than about 1.0 wt. %.

Embodiment 56. The polyurethane foam of any one of embodiments 1, 2, 3, and 4, wherein the polyurethane foam comprises isocyanate.

Embodiment 57. The polyurethane foam of embodiment 56, wherein the polyurethane foam comprises a isocyanate content of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. % or at least about 15 wt. %.

Embodiment 58. A method of forming a polyurethane foam comprising: providing a raw material mixture comprising: a raw first polyol component comprising a polyether polyol having a functionality of at least about 5; and a raw second polyol component comprising at least one component selected from the group of a polyether polyol having a functionality of not greater than about 4, and a polyester polyol having a functionality of not greater than about 4, and forming the raw material mixture into a polyurethane foam, wherein the polyurethane foam comprises a density of not greater than about 200 kg/m$^3$, wherein the polyurethane foam comprises a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

Embodiment 59. A method of forming a polyurethane foam comprising: providing a raw material mixture comprising: a raw first polyol component comprising a polyether polyol having a functionality of at least about 5; and a raw second polyol component comprising at least one component selected from the group of a polyether polyol having a functionality of not greater than about 4, and a polyester polyol having a functionality of not greater than about 4, and forming the raw material mixture into a polyurethane foam, wherein the polyurethane foam comprises a density of not greater than about 200 kg/m$^3$, wherein the polyurethane foam comprises a HBF rating based on a UL94 flame retardancy test performed at a polyurethane foam thickness of 1.0 mm.

Embodiment 60. The method of embodiment 59, wherein the polyurethane foam comprises a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

Embodiment 61. The method of embodiment 58, wherein the polyurethane foam comprises a HBF rating based on a UL94 flame retardancy test performed at a polyurethane foam thickness of 1.0 mm.

Embodiment 62. The method of any one of embodiments 58, 59, 60, and 61, wherein the polyurethane foam comprises a $CFD_{70}$ of at least about 100 KPa.

Embodiment 63. The method of any one of embodiments 58, 59, 60, and 61, wherein the polyurethane foam comprises a $CFD_{70}$ of not greater than about 250 KPa.

Embodiment 64. The method of any one of embodiments 58, 59, 60, and 61, wherein the polyurethane foam comprises a $CFD_{10}$ of at least about 15 KPa.

Embodiment 65. The method of any one of embodiments 58, 59, 60, and 61, wherein the polyurethane foam comprises a $CFD_{10}$ of not greater than about 50 KPa.

Embodiment 66. The method of any one of embodiments 58, 59, 60, and 61, wherein the polyurethane foam comprises a density of not greater than about 190 kg/m$^3$.

Embodiment 67. The method of any one of embodiments 58, 59, 60, and 61, wherein the polyurethane foam comprises a density of at least about 10 kg/m$^3$.

Embodiment 68. The method of any one of embodiments 58, 59, 60, and 61, wherein the first polyol component comprises an OH number of at least about 400 KOH mg/g.

Embodiment 69. The method of any one of embodiments 58, 59, 60, and 61, the raw first polyol component comprises an OH number of not greater than about 450 KOH mg/g.

Embodiment 70. The method of any one of embodiments 58, 59, 60, and 61, wherein the raw first polyol component comprises a molecular mass of at least about 680 g/mol.

Embodiment 71. The method of any one of embodiments 58, 59, 60, and 61, wherein the raw first polyol component comprises a molecular mass of not greater than about 850 g/mol.

Embodiment 72. The method of any one of embodiments 58, 59, 60, and 61, wherein the raw first polyol component comprises a functionality of 5.

Embodiment 73. The method of any one of embodiments 58, 59, 60, and 61, wherein the raw first polyol component comprises a functionality of 6.

Embodiment 74. The method of any one of embodiments 58, 59, 60, and 61, wherein the raw first polyol component comprises a functionality of 7.

Embodiment 75. The method of any one of embodiments 58, 59, 60, and 61, wherein the raw first polyol component comprises a functionality of 8.

Embodiment 76. The method of any one of embodiments 58, 59, 60, and 61, wherein the raw material mixture comprises raw first polyol component content of at least about 2 wt. % for a total weight of the raw material mixture.

Embodiment 77. The method of any one of embodiments 58, 59, 60, and 61, wherein the raw material mixture comprises a raw first polyol component content of not greater than about 10 wt. % for a total weight of the raw material mixture.

Embodiment 78. The method of any one of embodiments 58, 59, 60, and 61, wherein the raw second polyol component comprises a polyether polyol having a functionality of not greater than about 4.

Embodiment 79. The method of any one of embodiments 58, 59, 60, and 61, wherein the raw second polyol component comprises a polyester polyol having a functionality of not greater than about 4.

Embodiment 80. The method of any one of embodiments 58, 59, 60, and 61, wherein the raw second polyol component comprises an OH number of at least about 250 KOH mg/g.

Embodiment 81. The method of any one of embodiments 58, 59, 60, and 61, wherein the raw second polyol component comprises an OH number of not greater than about 350 KOH mg/g.

Embodiment 82. The method of any one of embodiments 58, 59, 60, and 61, wherein the raw second polyol component comprises a molecular mass of at least about 500 g/mol.

Embodiment 83. The method of any one of embodiments 58, 59, 60, and 61, wherein the raw second polyol component comprises a molecular mass of not greater than about 650 g/mol.

Embodiment 84. The method of any one of embodiments 58, 59, 60, and 61, wherein the raw second polyol component comprises a functionality of 4.

Embodiment 85. The method of any one of embodiments 58, 59, 60, and 61, wherein the raw second polyol component comprises a functionality of 3.

Embodiment 86. The method of any one of embodiments 58, 59, 60, and 61, wherein the raw second polyol component comprises a functionality of 2.

Embodiment 87. The method of any one of embodiments 58, 59, 60, and 61, wherein the raw second polyol component comprises a functionality of 1.

Embodiment 88. The method of any one of embodiments 58, 59, 60, and 61, wherein the raw material mixture comprises a raw second polyol component content of at least about 5.0 wt. % for a total weight of the raw material mixture.

Embodiment 89. The method of any one of embodiments 58, 59, 60, and 61, wherein the raw material mixture comprises a raw second polyol component content of not greater than about 15.0 wt. % for a total weight of the raw material mixture.

Embodiment 90. The method of any one of embodiments 58, 59, 60, and 61, wherein the raw material mixture further comprises a raw third polyol component.

Embodiment 91. The method of embodiment 90, wherein the raw third polyol component comprises an OH number of at least about 10 KOH mg/g.

Embodiment 92. The method of embodiment 90, wherein the raw third polyol component comprises an OH number of not greater than about 30 KOH mg/g.

Embodiment 93. The method of embodiment 90, wherein the raw third polyol component comprises a molecular mass of at least about 7000 g/mol.

Embodiment 94. The method of embodiment 90, wherein the raw third polyol component comprises a molecular mass of not greater than about 10000 g/mol.

Embodiment 95. The method of embodiment 90, wherein the raw third polyol component comprises a functionality of 4.

Embodiment 96. The method of embodiment 90, wherein the raw third polyol component comprises a functionality of 3.

Embodiment 97. The method of embodiment 90, wherein the raw third polyol component comprises a functionality of 2.

Embodiment 98. The method of embodiment 90, wherein the raw third polyol component comprises a functionality of 1.

Embodiment 99. The method of embodiment 90, wherein the raw material mixture comprises a raw third polyol component content of at least about 5.0 wt. % for a total weight of the raw material mixture.

Embodiment 100. The method of embodiment 90, wherein the raw material mixture comprises a raw third polyol component content of not greater than about 25.0 wt. % for a total weight of the raw material mixture.

Embodiment 101. The method of any one of embodiments 58, 59, 60, and 61, wherein the raw material mixture comprises a raw catalyst.

Embodiment 102. The method of embodiment 101, wherein the raw material mixture comprises a raw catalyst content of at least about 0.1 wt. % for a total weight of the raw material mixture or at least about 0.25 wt. % or at least about 0.5 wt. % or at least about 0.75 wt. % or at least about 1.0 wt. % or at least about 1.25 wt. % or at least about 1.5 wt. %.

Embodiment 103. The method of embodiment 101, wherein the raw material mixture comprises a raw catalyst content of not greater than about 5.0 wt. % for a total weight of the raw material mixture or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 104. The method of any one of embodiments 58, 59, 60, and 61, wherein the raw material mixture comprises a raw pigment.

Embodiment 105. The method of embodiment 104, wherein the raw material mixture comprises a raw pigment content of at least about 0.1 wt. % for a total weight of the raw material mixture or at least about 0.25 wt. % or at least about 0.5 wt. % or at least about 0.75 wt. % or at least about 1.0 wt. % or at least about 1.25 wt. % or at least about 1.5 wt. %.

Embodiment 106. The method of embodiment 104, wherein the raw material mixture comprises a raw pigment content of not greater than about 5.0 wt. % for a total weight of the raw material mixture or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 107. The method of any one of embodiments 58, 59, 60, and 61, wherein the raw material mixture comprises a raw chain extender.

Embodiment 108. The method of embodiment 107, wherein the raw material mixture comprises a raw chain extender content of at least about 0.1 wt. % for a total weight of the raw material mixture or at least about 0.25 wt. % or at least about 0.5 wt. % or at least about 0.75 wt. % or at least about 1.0 wt. % or at least about 1.25 wt. % or at least about 1.5 wt. %.

Embodiment 109. The method of embodiment 107, wherein the raw material mixture comprises a raw chain extender content of not greater than about 5.0 wt. % for a total weight of the raw material mixture or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 110. The method of any one of embodiments 58, 59, 60, and 61, wherein the raw material mixture comprises a raw thixotropic agent.

Embodiment 111. The method of embodiment 110, wherein the raw material mixture comprises a raw thixotropic agent content of at least about 0.1 wt. % for a total weight of the raw material mixture or at least about 0.25 wt. % or at least about 0.5 wt. % or at least about 0.75 wt.

Embodiment 112. The method of embodiment 110, wherein the raw material mixture comprises a raw thixotropic agent content of not greater than about 4.0 wt. % for a total weight of the raw material mixture or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or not greater than about 1.0 wt. %.

Embodiment 113. The method of any one of embodiments 58, 59, 60, and 61, wherein the raw material mixture comprises raw isocyanate.

Embodiment 114. The method of embodiment 113, wherein the raw material mixture comprises a raw isocyanate content of at least about 8 wt. % for a total weight of the raw material mixture or at least about 9 wt. % or at least about 10 wt. % or at least about 11 wt. % or at least about 12 wt. % or at least about 13 wt. % or at least about 14 wt. % or at least about 15 wt. %.

EXAMPLES

The concepts described herein will be further described in the following Examples, which do not limit the scope of the invention described in the claims.

Example 1

Two sample polyurethane foams S1, and S2 were formed according to embodiments described herein. The compositions of each sample polyurethane foam S1, and S2 are summarized in Table 1 below.

TABLE 1

Sample Foam Composition

| Component | S1 (wt. % for a total weight of the sample) | S2 (wt. % for a total weight of the sample) |
|---|---|---|
| First Polyol | 5.87 | 6.2 |
| Second Polyol (Polyether) | 8.39 | — |
| Second Polyol (Polyester) | — | 10.33 |
| Third Polyol | 16.78 | 16.53 |
| Fourth Polyol | 25.17 | 18.6 |
| Catalyst | 1.34 | 1.65 |
| Pigment | 1.68 | 2.07 |
| Chain extender | 1.34 | 4.13 |
| Filler | 10.07 | 10.33 |
| Isocyanate | 27.68 | 27.89 |

Each of the sample polyurethane foams were formed by mixing all the liquid components (including the first polyol, second polyol, third polyol, fourth polyol, surfactant, catalyst, pigment, chain extender) until the liquid phase is homogeneous. Then, any fillers were added to the liquid mixture. The combined mixture was then mixed until it reached a homogeneous composition. Finally, the isocyanate was added to the combined mixture. The final mixture was cured in an over at 170° C. oven for several minutes.

Each of the sample polyurethane foams were tested to determine the compression force deflection (CFD) of the polyurethane foam measured at a 70% compression ratio, the compression force deflection (CFD) of the polyurethane foam measured at a 10% compression ratio, a compression curve ratio $CFD_{70}/CFD_{10}$.

TABLE 2

Compression Force Deflection and Compression Curve Ratio

| Property | S1 | S2 |
|---|---|---|
| Density (kg/m$^3$) | 140 | 140 |
| $CFD_{10}$ | 20.3 | 24.27 |
| $CFD_{70}$ | 133.7 | 165.94 |
| $CFD_{70}/CFD_{10}$ | 6.59 | 6.84 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A polyurethane foam formed from a raw material mixture, wherein the raw material mixture comprises:

a first polyol component at a concentration of at least about 4 wt. % and not greater than about 7 wt. % for a total weight of the raw material mixture, wherein the first polyol component comprises a polyether polyol having a functionality of at least about 5, and wherein the first polyol component has an OH number of at least about 400 KOH mg/g and not greater than about 450 KOH mg/g;

a second polyol component comprising at least one component selected from the group of a polyether polyol having a functionality of not greater than about 4, a polyester polyol having a functionality of not greater than about 4, and wherein the second polyol component has an OH number of at least about 250 KOH mg/g and not greater than about 350 KOH mg/g; and an isocyanate component, wherein the polyurethane foam has a density of at least 120 kg/m$^3$ and not greater than about 200 kg/m$^3$, and wherein the polyurethane foam has a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

2. The polyurethane foam of claim 1, wherein the polyurethane foam has a HBF rating based on a UL94 flame retardancy test performed at a polyurethane foam thickness of 1.0 mm.

3. The polyurethane foam of claim 1, wherein the polyurethane foam has a $CFD_{70}$ of at least about 100 KPa and not greater than about 250 KPa.

4. The polyurethane foam of claim 1, wherein the polyurethane foam has a $CFD_{10}$ of at least about 15 KPa and not greater than about 50 KPa.

5. The polyurethane foam of claim 1, wherein the polyurethane foam has a density of at least about 120 kg/m$^3$ and not greater than about 190 kg/m$^3$.

6. The polyurethane foam of claim 1, wherein the first polyol component has an OH number of at least about 420 KOH mg/g and not greater than about 440 KOH mg/g.

7. The polyurethane foam of claim 1, wherein the first polyol component has a molecular mass of at least about 680 g/mol and not greater than about 850 g/mol.

8. The polyurethane foam of claim 1, wherein the second polyol component has a molecular mass of at least about 500 g/mol and not greater than about 650 g/mol.

9. The polyurethane foam of claim 1, wherein the raw material mixture comprises a second polyol component content of at least about 5.0 wt. % and not greater than about 15.0 wt. % for a total weight of the raw material mixture.

10. The polyurethane foam of claim 1, wherein the polyurethane foam further comprises a third polyol component.

11. A polyurethane foam formed from a raw material mixture, wherein the raw material mixture comprises:

a first polyol component at a concentration of at least about 4 wt. % and not greater than about 7 wt. % for a total weight of the raw material mixture, wherein the first polyol component comprises a polyether polyol having a functionality of at least about 5, and wherein the first polyol component has an OH number of at least about 400 KOH mg/g and not greater than about 450 KOH mg/g;

a second polyol component comprising at least one component selected from the group of a polyether polyol having a functionality of not greater than about 4, a polyester polyol having a functionality of not greater than about 4, and wherein the second polyol component has an OH number of at least about 250 KOH mg/g and not greater than about 350 KOH mg/g; and an isocyanate component, wherein the polyurethane foam has a density of at least 120 kg/m$^3$ and not greater than about 200 kg/m$^3$, wherein the polyurethane foam has a HBF rating based on a UL94 flame retardancy test performed at a polyurethane foam thickness of 1.0 mm.

12. The polyurethane foam of claim 11, wherein the polyurethane foam has a $CFD_{70}$ of at least about 100 KPa and not greater than about 250 KPa.

13. The polyurethane foam of claim 11, wherein the polyurethane foam has a $CFD_{10}$ of at least about 15 KPa and not greater than about 50 KPa.

14. The polyurethane foam of claim 11, wherein the second polyol component content is provided in an amount of at least about 5.0 wt. % and not greater than about 15.0 wt. % based on the total weight of the polyurethane foam.

15. The polyurethane foam of claim 11, wherein the polyurethane foam further comprises a third polyol component.

16. A method of forming a polyurethane foam comprising:

providing a raw material mixture comprising:

a raw first polyol component at a concentration of at least about 4 wt. % and not greater than about 7 wt. % for a total weight of the raw material mixture, wherein the raw first polyol component comprises a polyether polyol having a functionality of at least about 5, and wherein the raw first polyol component has an OH number of at least about 400 KOH mg/g and not greater than about 450 KOH mg/g;

a raw second polyol component comprising at least one component selected from the group of a polyether polyol having a functionality of not greater than about 4, a polyester polyol having a functionality of not greater than about 4, and wherein the raw second polyol component has an OH number of at least about 250 KOH mg/g and not greater than about 350 KOH mg/g; and a raw isocyanate component, and forming the raw material mixture into a polyurethane foam, wherein the polyurethane foam has a density of at least 120 kg/m$^3$ and not greater than about 200 kg/m$^3$, wherein the polyurethane foam has a compression curve ratio $CFD_{70}/CFD_{10}$ of not greater than about 10, where $CFD_{70}$ is equal to the compression force deflection (CFD) of the polyurethane foam measured at a 70% compression ratio and $CFD_{10}$ is equal to the compression force deflection (CFD) of the polyurethane foam measured at a 10% compression ratio.

* * * * *